United States Patent
Harvey et al.

(10) Patent No.: US 9,216,885 B1
(45) Date of Patent: Dec. 22, 2015

(54) BLADDER AND ENGAGEMENT DEVICE FOR STORAGE TANK

(75) Inventors: James F. Harvey, Weiman, TX (US); Pete K. Alvarez, Pasadena, CA (US); Rodney Scott Holland, Deer Park, TX (US); Rodney Scott Holland, Jr., Deer Park, TX (US); John Bilke, Katy, TX (US); Tommy Garcia, Houston, TX (US); Jon Daniel, Victoria, TX (US)

(73) Assignee: HYDROCHEM LLC, Atlanta, GA (US)

( * ) Notice: Subject to any disclaimer, the term of this patent is extended or adjusted under 35 U.S.C. 154(b) by 53 days.

(21) Appl. No.: 12/961,902

(22) Filed: Dec. 7, 2010

Related U.S. Application Data (60) Provisional application No. 61/267,333, filed on Dec. 7, 2009, provisional application No. 61/370,748, filed on Aug. 4, 2010.

(51) Int. Cl.
*B67B 7/00* (2006.01)
*B65D 35/56* (2006.01)

(52) U.S. Cl.
CPC .. *B67B 7/00* (2013.01); *B65D 35/56* (2013.01)

(58) Field of Classification Search
CPC .......................................................... B67B 7/00
USPC ......... 222/95, 105, 386–386.5, 185.1, 51, 41, 222/43, 64–67, 189.06, 129, 130, 389, 564, 222/1; 141/317, 231, 192, 198, 95; 280/837–839; 137/395–399, 899.4; 220/1.6
See application file for complete search history.

(56) References Cited

U.S. PATENT DOCUMENTS

| | | | |
|---|---|---|---|
| 2,664,911 A | 1/1954 | Thompson et al. | |
| 2,744,662 A * | 5/1956 | Fletcher et al. | 222/95 |
| 2,836,963 A | 6/1958 | Fox | |
| 3,200,999 A * | 8/1965 | Price, Jr. | 222/185.1 |
| 3,315,611 A | 4/1967 | Thompson | |
| 3,680,560 A | 8/1972 | Pannier, Jr. et al. | |
| 3,866,474 A | 2/1975 | Hasselmann | |
| 3,907,169 A * | 9/1975 | Gortz et al. | 222/95 |
| 3,949,720 A | 4/1976 | Zipprich et al. | |
| 4,082,124 A | 4/1978 | Jenkins | |
| 4,213,479 A | 7/1980 | Pearson | |
| 4,461,402 A | 7/1984 | Fell et al. | |
| 4,681,571 A | 7/1987 | Nehring | |
| 4,796,676 A | 1/1989 | Hendershot et al. | |
| 5,038,960 A | 8/1991 | Seery | |
| 5,067,636 A | 11/1991 | Pfeiffer et al. | |
| 5,137,175 A * | 8/1992 | Kowalski et al. | 222/1 |
| 5,183,086 A | 2/1993 | Fanta et al. | |
| 5,234,419 A | 8/1993 | Bryant et al. | |
| 5,279,602 A | 1/1994 | Middaugh et al. | |
| 5,282,550 A | 2/1994 | Coleman | |
| 5,377,875 A * | 1/1995 | Kock et al. | 222/95 |
| 5,397,020 A | 3/1995 | Witt | |
| 5,465,874 A * | 11/1995 | Roach et al. | 222/51 |

(Continued)

*Primary Examiner* — Paul R Durand
*Assistant Examiner* — Andrew P Bainbridge
(74) *Attorney, Agent, or Firm* — Greenberg Traurig LLP (57) ABSTRACT

An apparatus and method for collection and containment of collected materials is provided. The apparatus can include a vacuum truck with at least one vacuum tank disposed thereon, the vacuum tank having a hollow interior region. A flexible bladder can be disposed within the hollow interior region of the vacuum tank. The bladder can be impermeable to and compatible with the collected material and capable of containing the material therewithin.

31 Claims, 7 Drawing Sheets

(56) References Cited

U.S. PATENT DOCUMENTS

| | | | | |
|---|---|---|---|---|
| 5,505,327 | A | 4/1996 | Witt | |
| 5,555,997 | A | 9/1996 | Nogles | |
| 5,613,622 | A | 3/1997 | Surrena et al. | |
| 5,636,760 | A | 6/1997 | Yamamoto et al. | |
| 5,797,520 | A * | 8/1998 | Donahue | 222/386.5 |
| 6,170,715 | B1 * | 1/2001 | Evans | 222/340 |
| 6,224,345 | B1 | 5/2001 | Dussault | |
| 6,286,700 | B1 | 9/2001 | Davidson | |
| 6,358,239 | B1 * | 3/2002 | Rake et al. | 604/890.1 |
| 6,367,666 | B1 * | 4/2002 | Hou et al. | 222/386.5 |
| 6,481,469 | B1 * | 11/2002 | Erwin et al. | 141/95 |
| 6,508,363 | B1 | 1/2003 | Crevasse | |
| 6,681,789 | B1 | 1/2004 | Moulis et al. | |
| 6,988,639 | B2 | 1/2006 | Arch | |
| 7,013,924 | B1 | 3/2006 | Meyers et al. | |
| 7,086,429 | B2 | 8/2006 | Moizumi | |
| 7,128,838 | B2 | 10/2006 | Dorin et al. | |
| 7,147,689 | B1 * | 12/2006 | Miller | 95/92 |
| 7,255,133 | B2 | 8/2007 | Meyers et al. | |
| 7,506,776 | B2 | 3/2009 | Podd | |
| 2005/0040253 | A1 | 2/2005 | Thornton | |
| 2005/0196331 | A1 | 9/2005 | Dove | |
| 2007/0023438 | A1 * | 2/2007 | Kenneth | 220/495.04 |
| 2008/0105708 | A1 * | 5/2008 | Ebikawa et al. | 222/145.1 |
| 2008/0271811 | A1 | 11/2008 | Healy | |
| 2008/0302819 | A1 * | 12/2008 | Stuart | 222/95 |
| 2009/0242566 | A1 | 10/2009 | Witheridge | |

* cited by examiner

BLADDER AND ENGAGEMENT DEVICE FOR STORAGE TANK

RELATED APPLICATIONS

This application claims the benefit, and priority benefit, of U.S. Provisional Patent Application Ser. No. 61/267,333, filed Dec. 7, 2009, entitled "Bladder System For Storage Tank," and U.S. Provisional Patent Application Ser. No. 61/370,748, filed Aug. 4, 2010, entitled "Bladder System With Carbon Scrubber For Storage Tank," both of which are incorporated herein in their entireties.

BACKGROUND

1. Field of Invention

The present subject matter relates generally to the field of reduction of materials emissions, and in particular, to a vacuum tank containing a flexible bladder for the containment of collected materials.

2. Description of the Related Art

Vacuum trucks, vacuum boxes and other similar vehicles or containers can be utilized to collect liquid materials. During the collection process, the materials sometimes produce vapor emissions that can be discharged into the atmosphere. For example, these exhaust emissions may be discharged from a vacuum pump used to deliver the materials to the vacuum tank or vented from a valve or other opening on the vacuum tank. These exhaust emissions can contain compounds such as benzene and hexane which can be harmful to the environment and cause health concerns. Federal, state and local regulations are requiring significant reductions of discharge of volatile organic compounds (VOCs) into the atmosphere. Thus, a reduction in the amount of these materials emissions is desired.

While certain embodiments will be described in connection with the preferred illustrative embodiments, it will be understood that it is not intended to limit the invention to those embodiments. On the contrary, it is intended to cover all alternatives, modifications, and equivalents, as may be included within the spirit and scope of the subject matter as defined by the claims provided herein.

SUMMARY

In accordance with the present illustrative embodiments, an apparatus and method for collection and containment of collected materials is described.

In an illustrative embodiment, the apparatus can include, for example, a vacuum truck with at least one vacuum tank disposed thereon, the vacuum tank having a tank wall and a hollow interior region. A flexible bladder can be disposed within the hollow interior region of the vacuum tank. The bladder can be impermeable to and compatible with the collected materials and capable of containing the material therewithin.

At least one opening can be formed in the bladder to allow the materials to enter or exit the bladder. The bladder can expand to collect and contain the materials. In an illustrative embodiment, the bladder can substantially conform to the dimensions of the hollow interior region of the vacuum tank when it is fully expanded.

An access port can be disposed on the vacuum tank to allow access to the hollow interior region of the tank. A vacuum pump can be attached to the access port to regulate the pressure of the hollow interior region of the tank, external to the bladder. When a vacuum is drawn on the hollow interior region, the bladder can expand to collect and contain the collected material therewithin.

The vacuum pump can be operable to pull a vacuum on the hollow interior region of the tank, external to the bladder. Further, the vacuum pump can be operable to pressurize or depressurize the hollow interior region of the tank, external to the bladder. The bladder can be impermeable to and compatible with the material. The bladder can be deflated when the vacuum pump pressurizes the hollow interior region of the tank, external to the bladder, or inflated when the vacuum pump depressurizes the hollow interior region of the tank, external to the bladder.

An engagement device can be disposed on the tank wall. The engagement device can be contacted by the bladder within the tank. The engagement device can be operable to regulate the pressurizing or depressurizing caused by the vacuum pump upon the engagement device being contacted by the bladder. The engagement device can contact the bladder and restrict the location and/or movement of the bladder within the hollow interior region when the bladder is deflated. The engagement device can contact the bladder to prevent the bladder from contacting the rear wall and/or interior surface of the tank with excessive force when the bladder is deflated. The engagement device can contact the bladder prior to, or subsequent to, the bladder contacting the rear wall and/or interior surface of the tank when the bladder is deflated. The engagement device can be operably connected to the vacuum pump to regulate the pressurizing or depressurizing of the hollow interior region when the engagement device is contacted by the bladder. The engagement device can send a signal to the vacuum pump prior to, or subsequent to, the bladder contacting the rear wall of the tank when the bladder is deflated. The engagement device can comprise an engagement face and an engagement rod, and the engagement face can be disposed on the engagement rod. The bladder can contact the engagement face when the bladder deflates within the interior region of the tank. A spring can surround the engagement rod and provide pressure against the engagement face.

In an illustrative embodiment, a method of unloading collected materials from a bladder located within a vacuum tank is provided. A hollow interior region can be provided within the vacuum tank. The bladder can be located within the hollow interior region. At least one opening can be provided on the bladder for the collected materials to exit the bladder. The hollow interior region can be pressurized external to the bladder to deflate the bladder and force the collected materials from the bladder. The bladder can be contacted with an engagement device within the hollow interior region when the bladder is substantially deflated. The pressurizing of the hollow interior region can be halted upon the bladder contacting the engagement device.

In certain of the present illustrative embodiments, the collected material is not released into the hollow interior region of the tank due to the bladder being impermeable to and compatible with the collected material. Thus, the likelihood of any of the collected materials being released into the atmosphere from the hollow interior region is substantially reduced.

DETAILED DESCRIPTION

Referring now to FIGS. 1-10, illustrative embodiments of an apparatus and method for collection and containment of collected materials are provided.

Apparatus 10 can include at least one vacuum tank 20. In an illustrative embodiment, tank 20 can be disposed on a vacuum truck 15. Tank 20 can be formed of steel or other rigid material. Tank 20 can have an outer tank wall 21, an interior tank wall surface 22 and a hollow interior region 25. A bladder 30 can be disposed within hollow interior region 25. Bladder 30 can store liquid, solids and/or vapor materials. Examples of materials that can be collected and stored include, without limitation, acids, alkaline materials, and/or hydrocarbons such as straight run gasoline, sour naphtha, raffinate, jet fuel and platformate, and any related vapors and/or emissions. Further, the collected materials can be liquids, sludges or liquids containing particulate solid matter.

Bladder 30 can be impermeable to, and compatible with, the collected materials to prevent, or substantially prevent, the materials from passing into, or dispersing within, hollow interior region 25 of tank 20. Impermeable generally means some or all of the materials cannot pass through bladder 30, or are substantially or significantly unable to pass through bladder 30. Compatible generally means the materials will not react with or dissolve bladder 30 or the level of reacting or dissolving is substantially or significantly reduced. Bladder 30 can be utilized to collect and contain exhaust emissions from the collected materials and prevent the collected materials from being discharged to the atmosphere.

In certain illustrative embodiments, bladder 30 can be formed of a flexible material, so that bladder 30 generally conforms to the shape of the interior region 25 of tank 20 when bladder 30 is filled to, or near, capacity or otherwise engages or substantially engages the interior wall 22 of tank 20. In certain illustrative embodiments, bladder 30 can be deflated and lie against, or near, a rear wall 31 and/or a bottom surface 32 (FIG. 1) of tank 20 when bladder 30 is empty or substantially empty, and can expand in a balloon-type fashion to substantially conform to the shape of interior region 25 (FIG. 2) when bladder 30 is filled. In certain illustrative embodiments, bladder 30 can be detachably connected to an inner wall surface 22 of interior region 25 of tank 20 at a plurality of surface points 22a, 22b.

At least one opening 35 can be formed in bladder 30 to allow liquid or vapor materials to enter or exit bladder 30. Tank inlet 40 can be disposed in wall 21 of tank 20, whereby the liquid or vapor material can pass through tank inlet 40 when tank inlet 40 is open in order to enter or exit bladder 30 via opening 35. In certain illustrative embodiments, a vacuum can be drawn within interior region 25 of tank 20 to cause expansion of bladder 30 (See, e.g., FIG. 2). For example, tank 20 can have at least one vacuum pump connection 50 disposed thereon that is accessible to interior region 25. An external vacuum source, for example a vacuum pump 55, can be attached to vacuum pump connection 50 and utilized to draw a vacuum on interior region 25 of tank 20. When the vacuum is drawn on tank 20, liquid material can flow from the liquid source, for example, an industrial tank 60, through inlet 40 and into bladder 30 through opening 35. Bladder 30 can fill up and/or expand to collect the liquid material. In certain illustrative embodiments, any vapors, volatile emissions or other compounds emanating from the liquid material can be contained within bladder 30 without evacuating into interior region 25 through bladder 30. Thus, the likelihood of any environmentally detrimental or hazardous exhausts entering the atmosphere from interior region 25 can be substantially reduced.

In certain illustrative embodiments, interior region 25 of tank 20 can be pressurized to empty material out of bladder 30. External vacuum pump 55 can be utilized to introduce pressurized air into interior region 25 of tank 20 via vacuum pump connection 50. When interior region 25 is pressurized, liquid material can flow out of bladder 30 through opening 35 and tank inlet 40 and bladder 30 will empty and/or collapse. In a specific illustrative embodiment, vacuum pump connection 50 can be opened and liquid material can gravity-feed out of bladder 30 via opening 35 and tank inlet 40, without the need for pressurizing with external vacuum pump 55.

In an illustrative embodiment, tank 20 can have a first end 70 and a second end 75, and first end 70 can have a door 27 that can open to allow for cleaning of bladder 30. (See, e.g., FIG. 3). For example, opening of bladder 30 can be sized to substantially fit on, or around, a mounting ring 90 of tank 20. In certain illustrative embodiments where tank 20 has a rounded shape, opening 35 can be sized to fit around the circumference of mounting ring 90. Even when door 27 is open, the seal formed between opening 35 of bladder 30 and mounting ring 90 of tank 20 can prevent cleaning materials entering opening 35 of bladder 30 from accessing interior region 25 of tank 20. Bladder 30 can have a shape much like the interior region of tank 20, such that when door 27 is closed and a vacuum is pulled on interior region 25, bladder 30 can expand to substantially conform to the shape of interior region 25. When door 27 is opened, the interior of bladder 30 can be cleaned by engaging vacuum pump 55 to create a vacuum in interior region 25, such that bladder 30 can substantially conform to the shape of interior region 25 thus presenting a large opening inside bladder 30 which can be utilized for washout. In certain illustrative embodiments, bladder 30 can be detachable from mounting ring 90 such that bladder 30 can be removed from interior region 25 of tank 20 and tank 20 can be cleaned.

In certain illustrative embodiments (FIGS. 4 & 5), a carbon scrubber 100 can be utilized to capture and absorb any fugitive emissions that could potentially escape and/or exit through bladder 30 and/or exhaust of vacuum pump 55. The carbon scrubber 100 can be a back-up system for capturing escaping emissions that are not captured by bladder 30. A vacuum can be drawn on the interior of tank 20 using vacuum pump 55. In certain illustrative embodiments, a plurality of vacuum pump connections 50a, 50b can be utilized to connect vacuum pump 55 to tank 20. Fugitive emissions can be transported via exhaust line 120 to carbon scrubber 100. A plurality of carbon scrubbers 100a, 100b can be utilized. The vacuum stream can be vented to atmosphere via vent 140 after being treated and cleaned by scrubbers 100a, 100b. A monitor 150 can disposed at or near scrubbers 100a, 100b to measure content of fugitive emissions. A flame arrester 160 can be disposed at or near emissions line 120 to prevent back-flashing into tank 20. One or more knockout pots 110, 130 can be utilized to collect liquid condensation.

Figure 1:
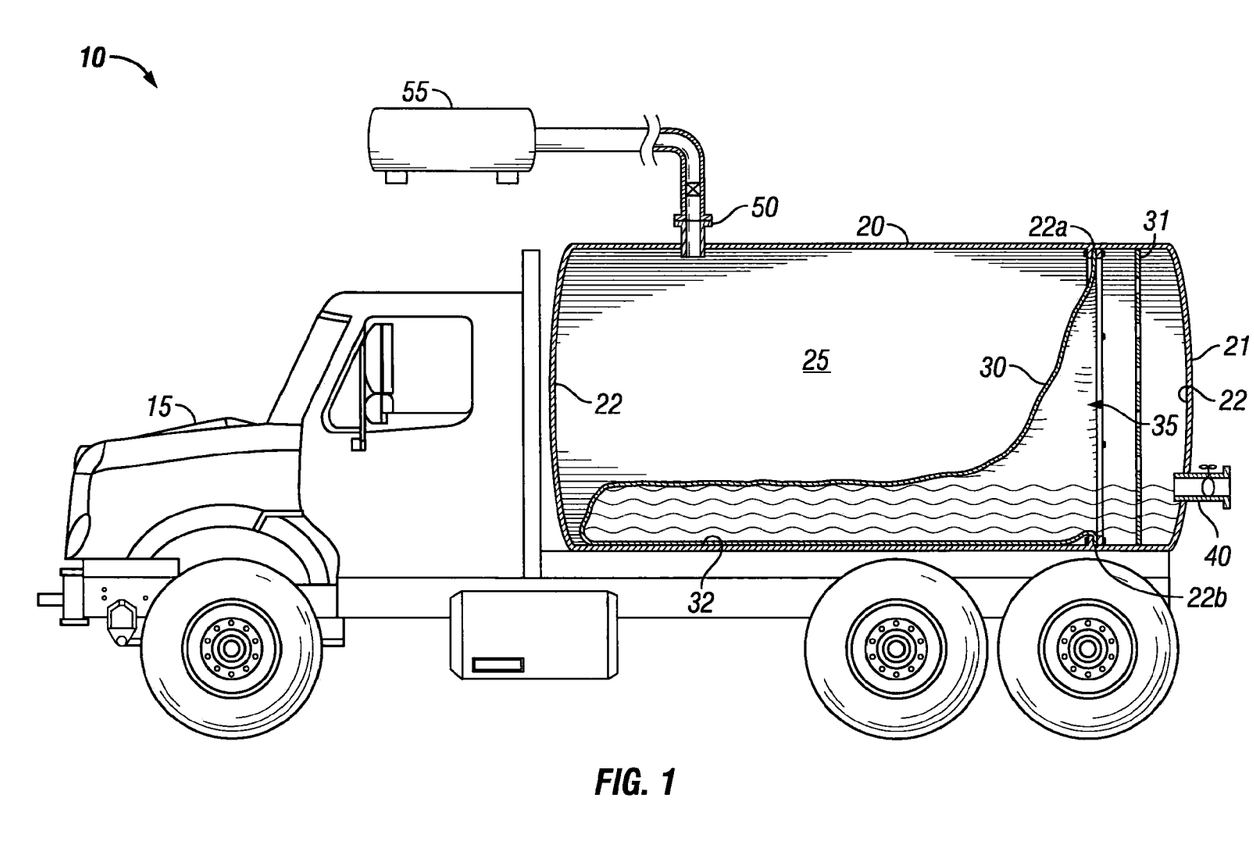
FIG. 1 is a side view of a vacuum tank with a collapsed bladder disposed against a bottom surface in an illustrative embodiment.
Figure 2:
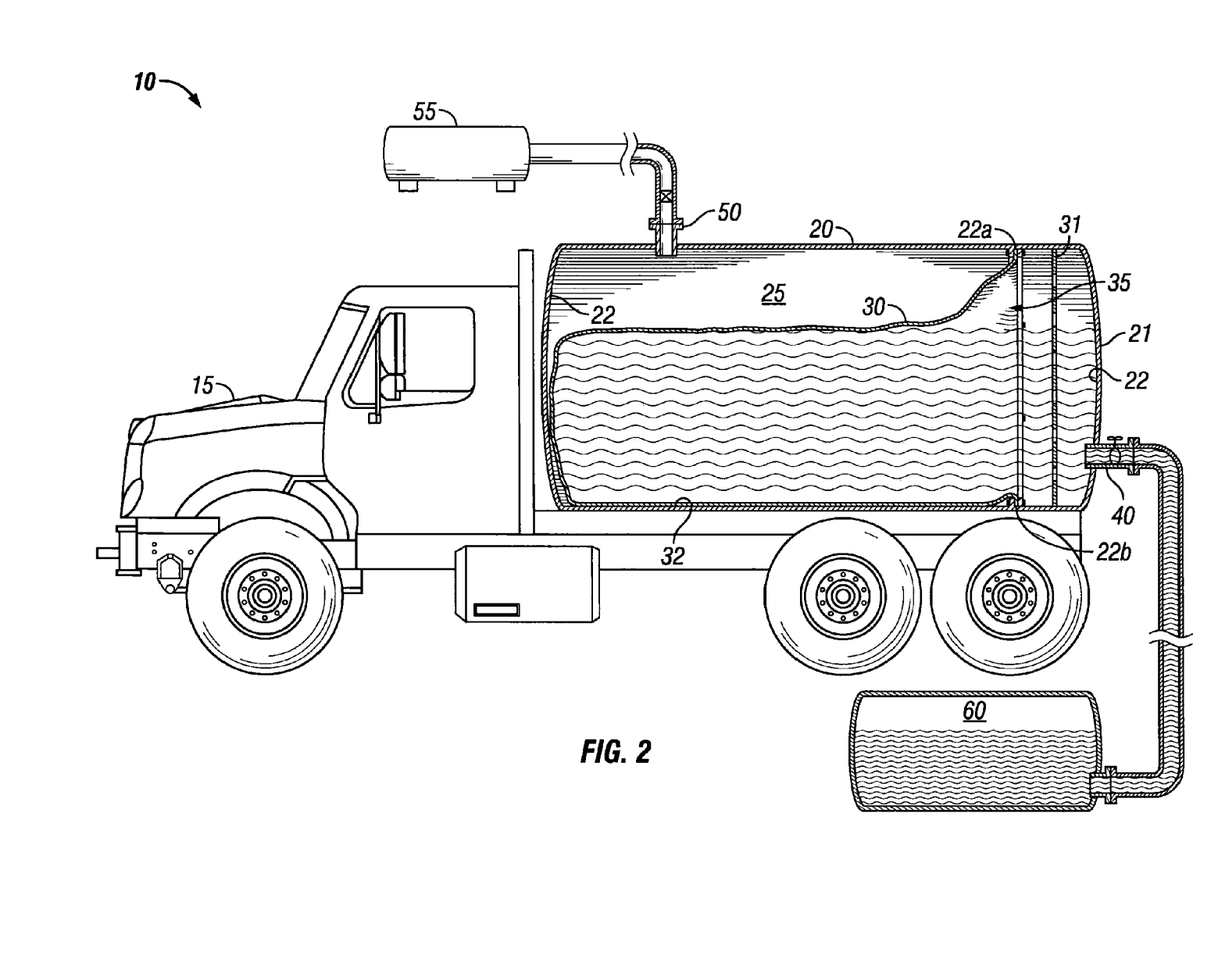
FIG. 2 is a side view of a vacuum tank with an expanded bladder in an illustrative embodiment.
Figure 3:
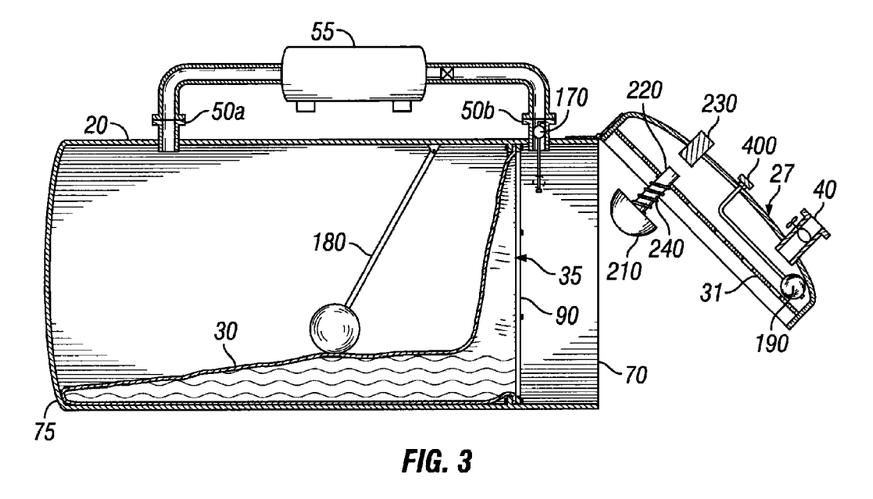
FIG. 3 is a side view of a vacuum tank with a collapsed bladder in an illustrative embodiment.
Figure 4:
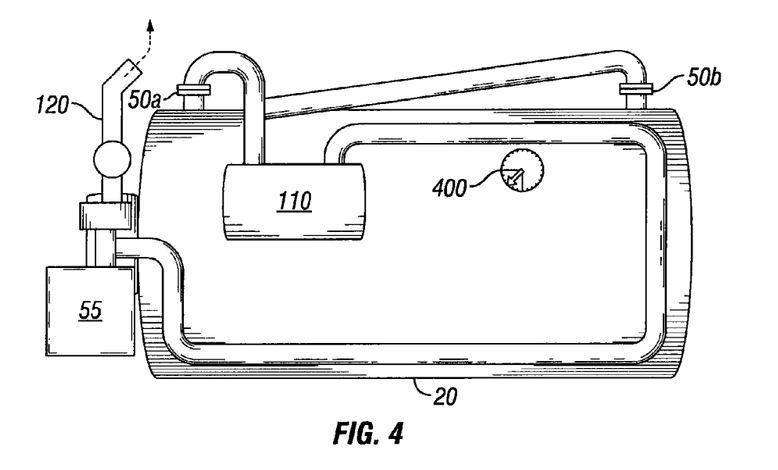
FIG. 4 is a side view of a vacuum tank exhaust system in an illustrative embodiment.
Figure 5:
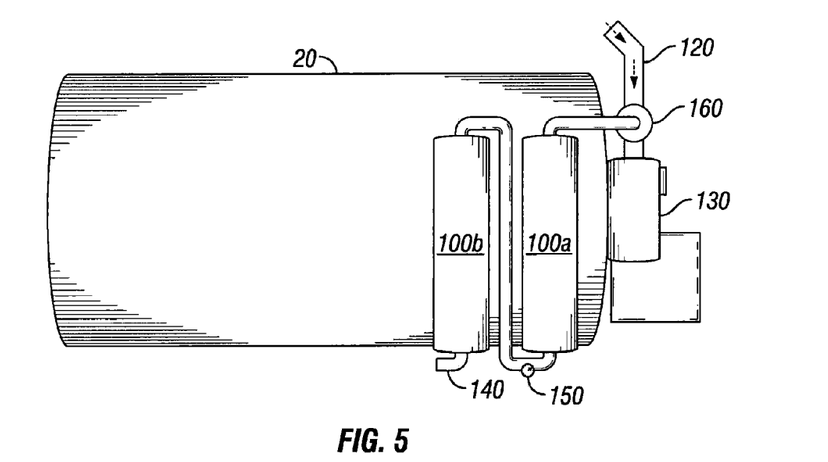
FIG. 5 is a side view of a vacuum tank having a carbon scrubber system for vacuum tank exhaust in an illustrative embodiment.
Figure 6:
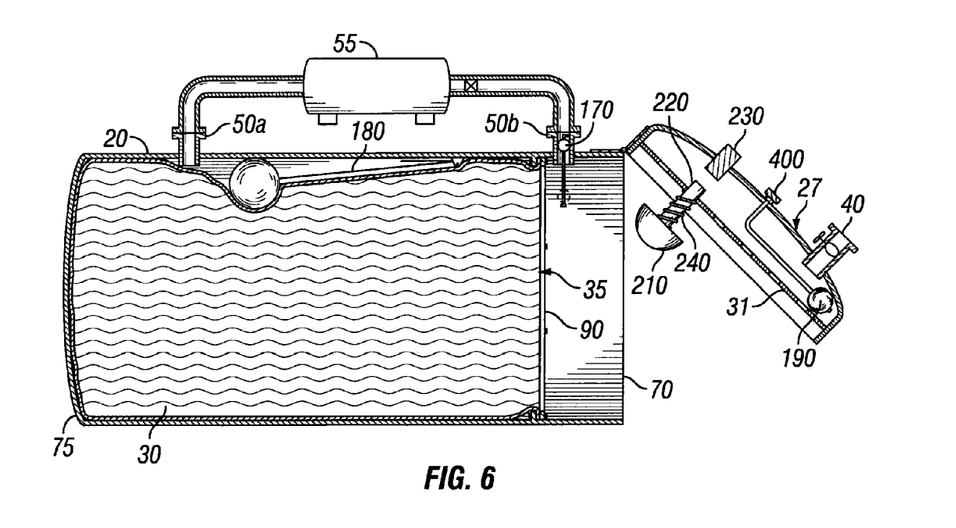
FIG. 6 is a side view of a vacuum tank with an expanded bladder in an illustrative embodiment.

As illustrated in FIG. 6, a float 170 can be disposed within vacuum pump connection 50 to seal and prevent liquid from exiting tank 20. In certain illustrative embodiments, a bladder level indicator 180 can be disposed exterior of bladder 30 within tank 20 to measure the bladder level within tank 20. A liquid level indicator 190 can be disposed at the interior of door 27 to measure the liquid level in bladder 30. Gauges 400 (see FIGS. 3, 4 & 6) can be disposed on the wall of tank 20 to allow a user to read the levels measured by bladder level indicator 180 and liquid level indicator 190.

In certain illustrative embodiments, rear wall 31 can be disposed at, or near, rear door 27 to cover and protect level indicator 190. (See FIGS. 6, 8 & 9). In an illustrative embodiment, rear wall 31 can be affixed to, and extend across the entire diameter of, rear door 27. One or more perforations 32 can be formed in rear wall 31. Perforations 32 can allow liquid and/or vapor to flow through rear wall 31, while filtering unwanted solid materials.

Prior to beginning certain vacuuming operations, it may be necessary to deflate bladder 30 within tank 20. (See, e.g., FIG. 1). This can be done, for example, by utilizing vacuum pump 55 to provide air pressure on the outer surface of bladder 30. As bladder 30 is deflated, it can potentially press against rear wall 31 or interior tank wall surface 22, or components disposed thereon. If pressed too forcefully, bladder 30 could be torn or damaged, or bladder 30 could potentially crush or damage rear wall 31, wall surface 22 or the components disposed thereon.

Figure 7:
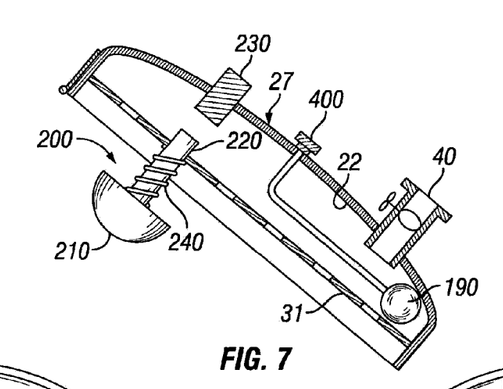
FIG. 7 is a side view of a door for a vacuum tank having a liquid level indicator and an engagement device disposed thereon in an illustrative embodiment.
Figure 8:
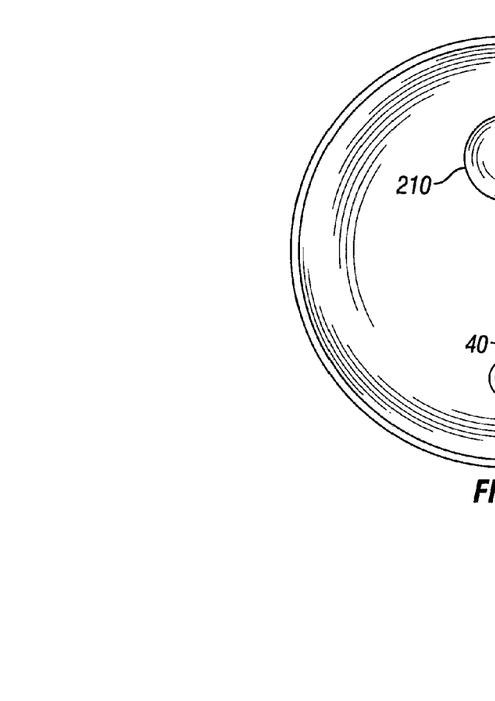
FIG. 8 is a front view of a door with a rear wall removed for a vacuum tank having a liquid level indicator and an engagement device disposed thereon in an illustrative embodiment.
Figure 9:
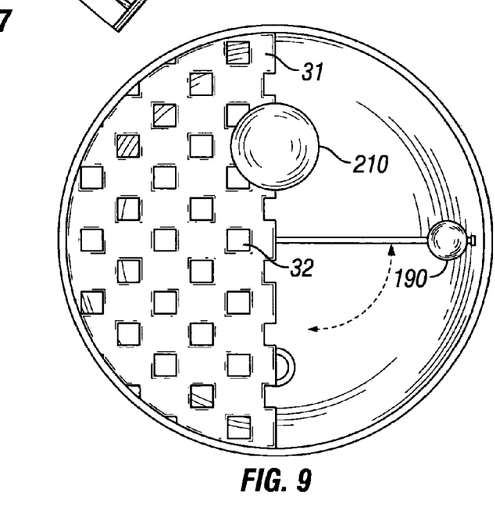
FIG. 9 is a front view of a rear wall (partially shown) and an engagement face for a vacuum tank in an illustrative embodiment.
Figure 10:
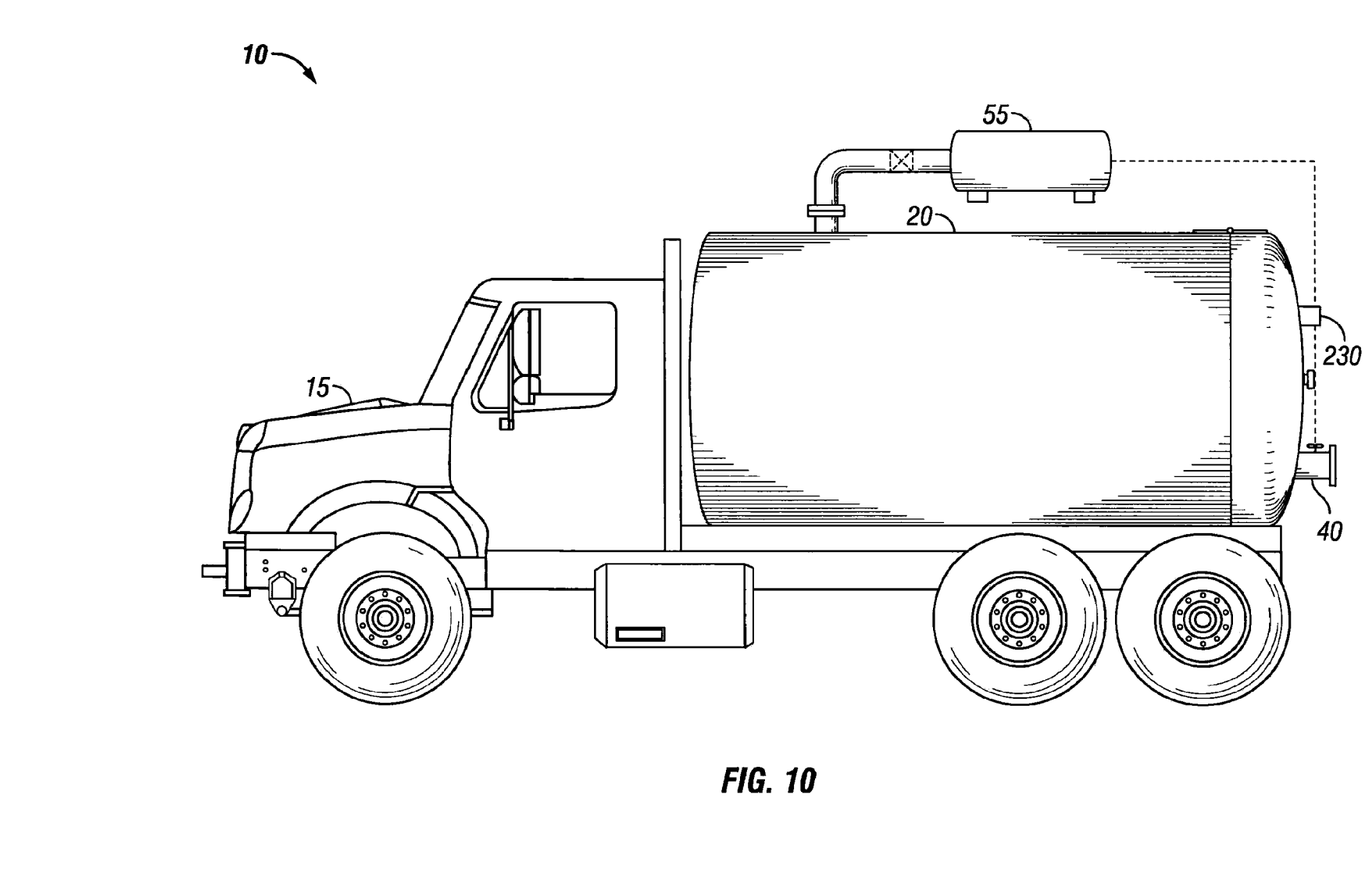
FIG. 10 is a side view of a vacuum tank having an engagement device in operable connection with a vacuum pump and tank inlet in an illustrative embodiment.
Figure 11:
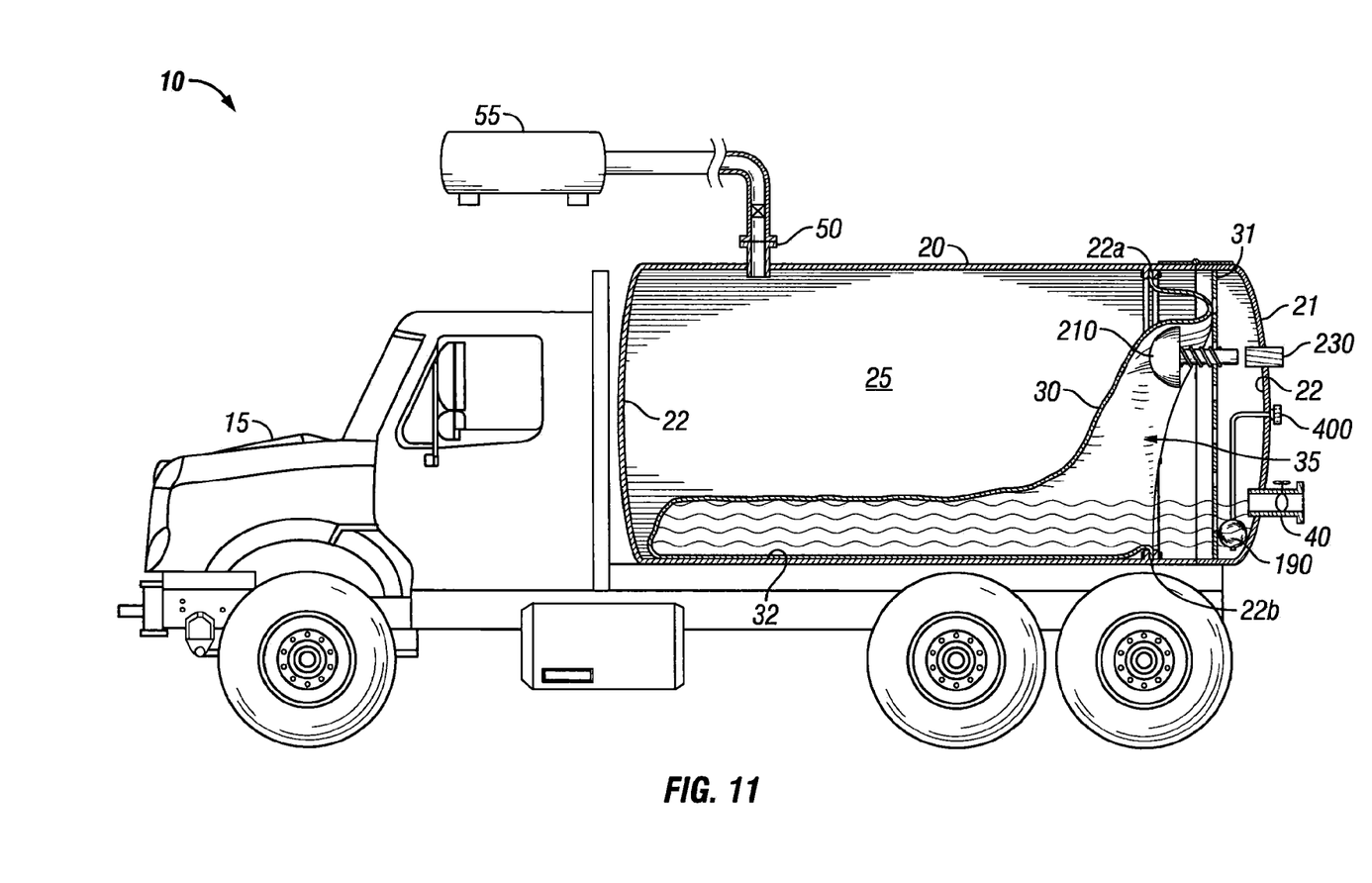
FIG. 11 is a side view of a vacuum tank having an engagement device in operable connection with a vacuum pump and tank inlet whereby the engagement device contacts the bladder subsequent to the bladder contacting the rear wall of the tank when the bladder is deflated in an illustrative embodiment.

In certain illustrative embodiments, an engagement device 200 can be disposed within interior region 25 of tank 20. For example, engagement device 200 can be disposed at door 27. (FIG. 7). In certain illustrative embodiments, engagement device 200 can be disposed at rear wall 31 and pass through both rear wall 31 and door 27. Engagement device 200 can be operably connected to vacuum pump 55. (FIG. 10). Engagement device 200 can also be operably connected to tank inlet 40. (FIG. 10). Bladder 30 can contact engagement device 200 as bladder 30 deflates within interior region 25. When bladder 30 contacts engagement device 200, engagement device 200 can subsequently disengage vacuum pump 55 to prevent further deflation. In certain illustrative embodiments, the tension on engagement device 200 can be set such that engagement device 200 can disengage vacuum pump 55 without bladder 30 contacting rear wall 31. In other illustrative embodiments, the tension on engagement device 200 can be set such that bladder 30 will first contact engagement device 200, then contact certain areas of rear wall 31, and then compress engagement device 200 to the extent necessary to disengage vacuum pump 55 to prevent further deflation.

In certain illustrative embodiments, engagement device 200 can comprise a spring pressure shut-off device. Device 200 can have an engagement face 210 mounted on a engagement rod 220. Engagement rod 220 can be a floating metal rod. In an illustrative embodiment, engagement rod 220 can pass through wall 21 of tank 20. In certain illustrative embodiments, engagement rod 220 can pass through door 27 of tank 20. When bladder 30 contacts engagement face 210, engagement rod 220 can be pushed into engagement with a switch 230 on the exterior of tank 20 that is in operational engagement with vacuum pump 55 to shut off vacuum pump 55 and halt pressurizing of hollow interior region 25. In certain illustrative embodiments, switch 230 can also be in operational engagement with tank inlet 40 to close tank inlet 40. In certain illustrative embodiments, a spring 240 can surround engagement rod 220 and provide pressure against engagement face 210. Spring 240 can hold engagement face 210 and/or engagement rod 220 in place to prevent accidental activation of switch 230.

According to the present illustrative embodiments, the collected materials can be deposited within bladder 30 and then transported within a facility or to a separate location for treatment, disposal, discharge or storage. The present illustrative embodiments are not limited to use with only mobile vehicles such as vacuum trucks. For example, any storage device, whether mobile or stationary, that is capable of utilizing bladder 30 to collect and contain materials under vacuum conditions would be in accordance with the present illustrative embodiments.

In the drawings and specification, there has been disclosed and described typical illustrative embodiments, and although specific terms are employed, the terms are used in a descriptive sense only and not for purposes of limitation. It will be apparent that various modifications and changes can be made within the spirit and scope of the subject matter as described in the foregoing specification. Accordingly, the subject matter is therefore to be limited only by the scope of the claims provided herein.

What is claimed is:

1. An apparatus for containment of collected materials, the apparatus comprising:
    at least one storage tank, the storage tank having a tank wall and a hollow interior region;
    a bladder disposed within the hollow interior region, the bladder being operable to contain the material therewithin;
    at least one opening formed in the bladder to allow the materials to enter or exit the bladder;
    an access port disposed on the storage tank and accessible to the hollow interior region of the tank;
    a vacuum pump attachable to the access port and operable to regulate the pressure of the hollow interior region of the tank, external to the bladder;
    an engagement device disposed at least partially internal to the bladder and operable to restrict the movement of the bladder within the hollow interior region; and
    a switch that is disposed in or near the tank wall and that is operably connected to the vacuum pump to regulate the depressurizing of the hollow interior region of the storage tank, such that when the bladder does not contact the engagement device, the engagement device and the switch are in a spaced-apart, non-contacting relationship with each other, and when the bladder contacts the engagement device, the engagement device is pushed into contact with the switch.

2. The apparatus of claim 1, wherein the vacuum pump is operable to pull a vacuum on the hollow interior region of the tank, external to the bladder.

3. The apparatus of claim 1, wherein the bladder is impermeable to and compatible with the collected material.

4. The apparatus of claim 1, wherein the bladder is deflated when the vacuum pump pressurizes the hollow interior region of the tank, external to the bladder.

5. The apparatus of claim 1, wherein the bladder is inflated when the vacuum pump depressurizes the hollow interior region of the tank, external to the bladder.

6. The apparatus of claim 4, wherein the engagement device contacts the bladder and restricts the location of the bladder within the hollow interior region when the bladder is deflated.

7. The apparatus of claim 6, wherein the bladder does not contact the engagement device when the bladder is expanded.

8. The apparatus of claim 4, wherein the engagement device contacts the bladder prior to the bladder contacting the interior surface of the tank when the bladder is deflated.

9. The apparatus of claim 8, wherein the bladder does not contact the engagement device when the bladder is expanded.

10. The apparatus of claim 4, wherein the tank has a rear wall disposed therein and the engagement device contacts the bladder prior to the bladder contacting the rear wall of the tank when the bladder is deflated.

11. The apparatus of claim 10, wherein the bladder does not contact the engagement device when the bladder is expanded.

12. The apparatus of claim 4, wherein the tank has a rear wall disposed therein and the engagement device contacts the bladder subsequent to the bladder contacting the rear wall of the tank when the bladder is deflated.

13. The apparatus of claim 1, wherein the engagement device comprises an engagement face and an engagement rod, and the engagement face is disposed on the engagement rod.

14. The apparatus of claim 4, wherein the bladder contacts the engagement face when the bladder deflates within the interior region of the tank.

15. The apparatus of claim 13, further comprising a spring that surrounds the engagement rod and provides pressure against the engagement face.

16. The apparatus of claim 1, further comprising one or more carbon scrubbers disposed on an exhaust of the vacuum pump to absorb materials from the exhaust stream.

17. The apparatus of claim 1, wherein the storage tank is disposed on a vacuum truck.

18. The apparatus of claim 1, wherein the vacuum pump is operable to introduce or remove air from the hollow interior region of the tank.

19. The apparatus of claim 1, further comprising a bladder level indicator disposed exterior of the bladder within the hollow interior region of the tank.

20. The apparatus of claim 1, wherein the bladder is detachably connected to an inner wall surface within the hollow interior region of the tank at a plurality of surface points.

21. The apparatus of claim 1, further comprising a tank inlet disposed on the tank wall and accessible to an opening in the bladder for the collected materials to exit the bladder, whereby the switch is operably connected to the tank inlet to regulate the collected materials exiting the bladder.

22. A method of unloading collected materials from a bladder located within a vacuum tank, the method comprising:
    providing a hollow interior region within the vacuum tank;
    locating the bladder within the hollow interior region;
    providing at least one opening on the bladder for the collected materials to exit the bladder;
    pressurizing the hollow interior region external to the bladder to deflate the bladder and force the collected materials from the bladder;
    contacting the bladder with an engagement device disposed at least partially internal to the bladder when the bladder is substantially deflated; and
    halting the pressurizing of the hollow interior region upon the bladder contacting the engagement device.

23. The method of claim 22, further comprising forcing the collected materials from the bladder through a tank outlet, and closing the tank outlet upon the bladder contacting the engagement device to stop the collected materials from exiting the bladder.

24. An apparatus for containment of collected materials, the apparatus comprising:
    at least one storage tank, the storage tank having an exterior tank wall and a hollow interior region;
    a bladder disposed within the hollow interior region, the bladder being operable to contain the collected materials therewithin;
    at least one opening formed in the bladder to allow the collected materials to exit the bladder;
    an interior wall disposed within the hollow interior region adjacent to the opening formed in the bladder;
    an access port disposed on the storage tank and accessible to the hollow interior region of the tank;
    a vacuum pump attachable to the access port and operable to regulate the pressure of the hollow interior region of the tank, external to the bladder; and
    an engagement device operable to restrict the movement of the bladder within the hollow interior region, wherein the engagement device comprises an engagement rod, an engagement face disposed on the engagement rod, and a spring that surrounds the engagement rod and provides pressure against the engagement face, and wherein the engagement rod passes through the interior wall and is operably connected to the vacuum pump to regulate the depressurizing of the hollow interior region of the storage tank.

25. The apparatus of claim 24, wherein the spring surrounds the engagement rod along the length of the engagement rod from the engagement face to the interior wall.

26. The apparatus of claim 25, further comprising a level indicator disposed within the hollow interior region of the tank on the opposite side of the interior wall from the bladder.

27. The apparatus of claim 24, wherein the engagement device is disposed at least partially internal to the bladder.

28. An apparatus for containment of collected materials, the apparatus comprising:
    at least one storage tank, the storage tank having a tank wall and a hollow interior region;
    a bladder disposed within the hollow interior region, the bladder being operable to contain the collected materials therewithin;
    at least one opening formed in the bladder to allow the materials to enter or exit the bladder;
    a tank inlet disposed on the tank wall and accessible to the opening in the bladder;
    an interior wall disposed within the hollow interior region and adjacent to the opening formed in the bladder, the interior wall having at least one perforation formed therein such that the collected materials can flow through the at least one perforation;
    an access port disposed on the storage tank and accessible to the hollow interior region of the tank;

a vacuum pump attachable to the access port and operable to regulate the pressure of the hollow interior region of the tank, external to the bladder; and an engagement device operable to restrict the movement of the bladder with respect to the interior wall, wherein the engagement device is operably connected to the vacuum pump to regulate the depressurizing of the hollow interior region of the storage tank, said engagement device disposed at least partially internal to the bladder.

29. The apparatus of claim 28, wherein the storage tank has a rear door, and the interior wall is disposed within the rear door and extends along the entire diameter thereof.

30. The apparatus of claim 28, wherein the interior wall has a plurality of perforations formed therein and the materials comprise solids, liquids and vapors, and wherein the solids are filtered from the materials as the materials pass through the perforations.

31. An apparatus for containment of collected materials, the apparatus comprising:
  at least one storage tank, the storage tank having a tank wall and a hollow interior region;
  a bladder disposed within the hollow interior region, the bladder being operable to contain the material therewithin;
  at least one opening formed in the bladder to allow the materials to enter or exit the bladder;
  an access port disposed on the storage tank and accessible to the hollow interior region of the tank;
  a vacuum pump attachable to the access port and operable to regulate the pressure of the hollow interior region of the tank, external to the bladder; and
  an engagement device disposed at least partially internal to the bladder on the tank wall and operable to restrict the movement of the bladder within the hollow interior region, wherein when the bladder contacts the engagement device, the engagement device is pushed into engagement with a switch that is disposed in or near the tank wall and that is operably connected to the vacuum pump to regulate the depressurizing of the hollow interior region of the storage tank.

* * * * *